June 25, 1968   C. M. JOHNSON ET AL   3,389,718
HIGH AND LOW PRESSURE WELLHEAD SHUT-IN VALVE
Filed Sept. 16, 1966   2 Sheets-Sheet 1
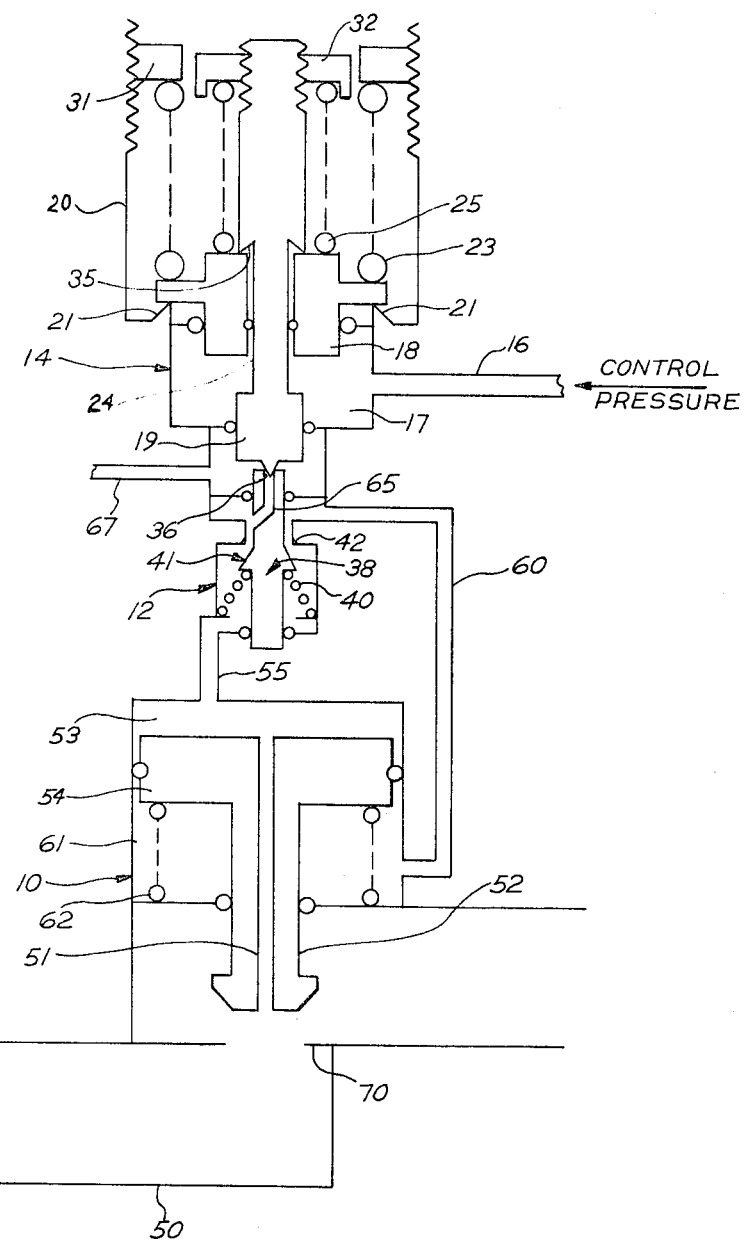
INVENTORS
CECIL M. JOHNSON &
BY  SHELBY E. ROSS
Bair, Freeman & Molinare
ATTORNEYS June 25, 1968
C. M. JOHNSON ET AL
3,389,718
HIGH AND LOW PRESSURE WELLHEAD SHUT-IN VALVE
Filed Sept. 16, 1966
2 Sheets-Sheet 2
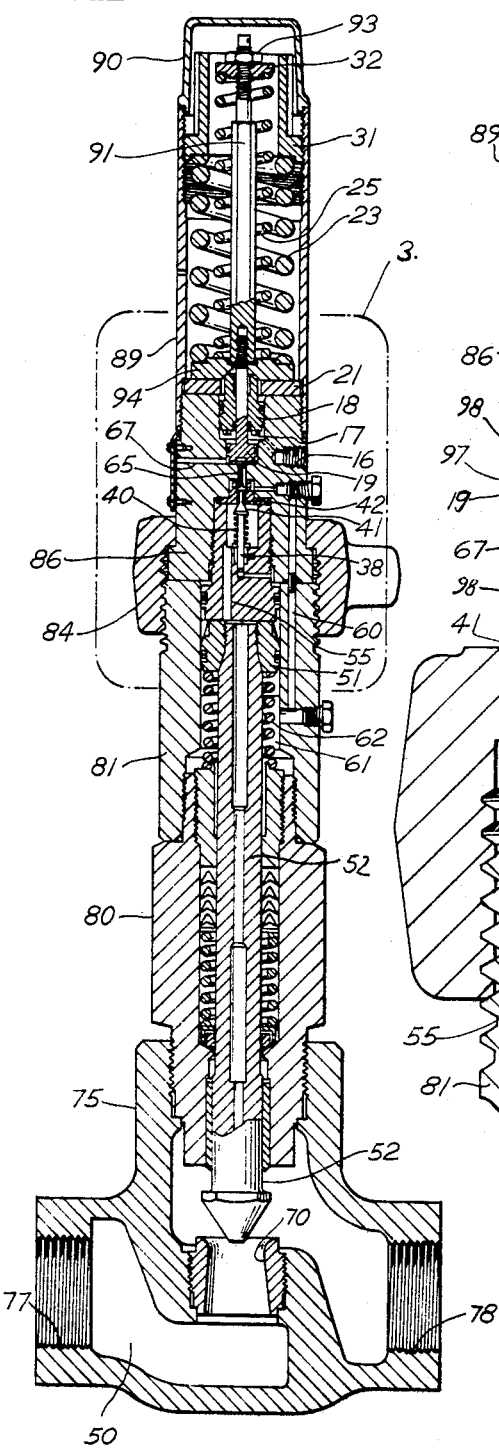
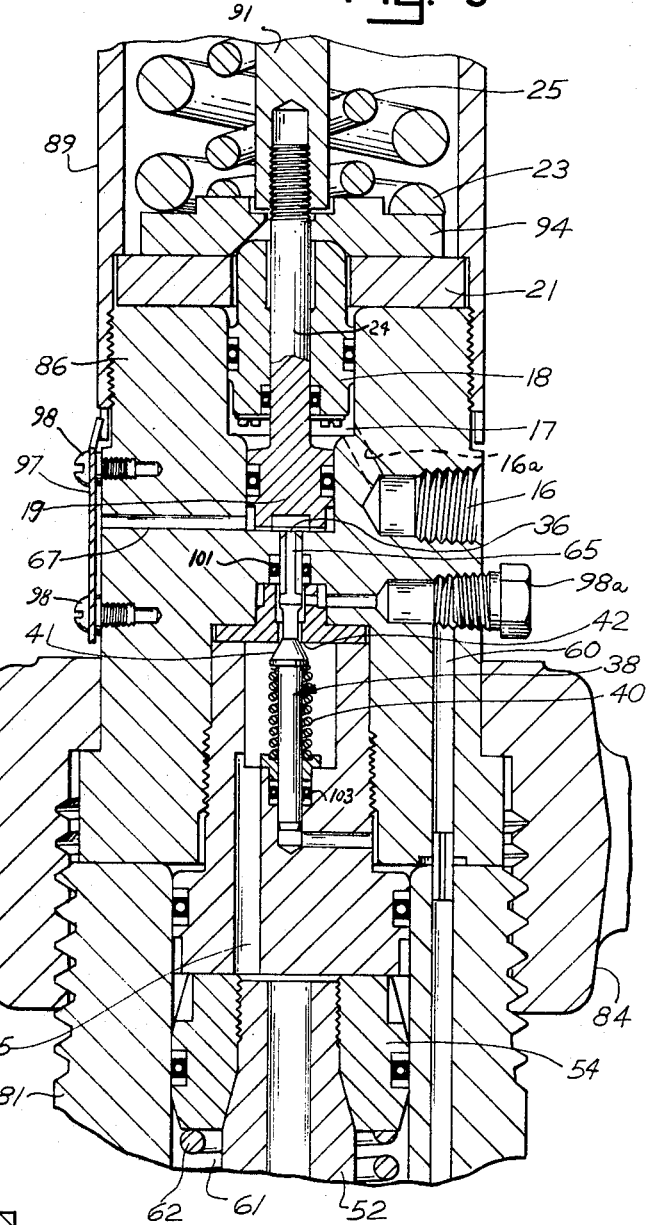
INVENTORS
CECIL M. JOHNSON &
BY SHELBY E. ROSS
Bair, Freeman & Molinare
ATTORNEYS United States Patent Office 3,389,718
Patented June 25, 1968

3,389,718
HIGH AND LOW PRESSURE WELLHEAD
SHUT-IN VALVE
Cecil M. Johnson, Marshalltown, Iowa, and Shelby E.
Ross, Houston, Tex., assignors to Fisher Governor Company, a corporation of Iowa
Filed Sept. 16, 1966, Ser. No. 579,994
11 Claims. (Cl. 137—492.5)

ABSTRACT OF THE DISCLOSURE

This invention is directed to a high and low pressure shut-off valve, wherein a small and a large piston are coupled together and control pressure is applied between the pistons. Both high and low control pressures cause movement of the small piston in the same direction to operate a three-way pilot valve means to close the shut-off valve.

---

This invention relates to an improved shut-off valve assembly for closing a flow line whenever the magnitude of a control pressure exceeds or falls below predetermined high and low values.

Safety valves capable of automatically shutting off a flow line whenever an existing pipeline pressure falls below or rises above a predetermined range are useful in a variety of applications. For example, it is often desirable to shut off the fluid flow from a well at the well head level whenever, for some reason, pressure within an associated pipe line departs from a predetermined acceptable range.

An object of the present invention is to provide an improved shut-off valve which may be actuated by a control pressure whenever that pressure falls below a predetermined minimum value or rises above a predetermined maximum value, such valve including a three-way pilot valve control and separately adjustable means for setting predetermined minimum and maximum values.

A further object of this invention is to provide an improved shut-off valve having automatic reset means for resetting such shut-off valve whenever the control pressure that has exceeded or fallen below predetermined values returns to a value within the predetermined range.

Another object of the present invention is to provide an automatic shut-off valve of improved sensitivity and accuracy.

The present invention takes the form of a shut-off valve which is adapted to be actuated to close a flow line whenever the magnitude of a control pressure departs from a predetermined pressure range. According to a principal aspect of the invention, a small and a large piston are positioned in spaced apart relation from one another within small and large axially aligned bores in a housing. Control pressure is applied to the junction between the two bores such that it tends to force the two pistons apart. Means are employed for biasing the larger piston against this control pressure while the smaller piston is spring loaded with respect to the larger piston against the control pressure. The small and larger pistons are coupled together such that the small piston is carried in a first direction whenever the larger piston moves in that direction while, at the same time, the small piston is capable of moving in the first direction independently of the larger piston. When the control pressure applied to the two pistons either rises above or falls below a predetermined range of values, the small piston is accordingly caused to move in the first direction. Three-way valve means responsive to the movement of the small piston in this first direction function to permit actuation of the shut-off valve to control fluid flow through the valve. According to a still further feature of the invention, means are employed for resetting the shut-off valve in response to the movement of this small piston in a direction opposite to the first direction.

These and other objects and advantages of the present invention will be made most manifest and particularly pointed out in clear, concise and exact terms, in conjunction with the accompanying drawing wherein:

FIG. 1 is a schematic drawing which illustrates the operating principles of the embodiment of the invention shown in detail in FIGS. 2 and 3;

FIG. 2 is a cross-sectional drawing of an automatic, pressure responsive shut-off valve assembly embodying the principles of the invention; and FIG. 3 is an enlarged detail view better illustrating the details of the central section of the valve assembly shown in FIG. 2.

Referring to FIG. 1, there is illustrated the principles of operation of the embodiment of the invention shown in FIGS. 2 and 3 in simplified, schematic form. The arrangement as depicted in FIG. 1 comprises a main shut-off valve indicated generally at 10, a vented pilot valve indicated generally at 12, and a pressure responsive valve actuator indicated generally at 14. As shown in FIG. 1, the main shut-off valve is open so as to permit fluid flow through the valve and the device is operating within the desired predetermined pressure range. Line pressure is communicated into chamber 53 above actuator piston 54 by means of bore or passage 51. The three-way pilot valve 12 is open and line pressure may pass through conduit 60 into chamber 61 below the piston 54. While normal pressure conditions exist in the system, the actuator piston 54 is pressure balanced and spring 62 biases the valve plug 52 open as seen in FIG. 1.

The pressure which controls the operation of the valve assembly illustrated in FIG. 1 is applied through the pressure line 16 to a control chamber. The control pressure may be provided from the system being controlled, for example, system pressure downstream from the valve, or from a separate source. The control pressure within chamber 17 is applied to both a large piston 18 and a small piston 19 and tends to force the two pistons apart. The larger, or high pressure piston 18 is normally held against an annular shoulder or abutment member 21 in housing 20 by means of a first compression spring 23. The spring 23 forces the larger, annular piston 18 downward with respect to the fixed walls of the valve assembly.

The smaller or low pressure piston 19 is provided with a shank or elongated stem 24 which extends upwardly through the annular piston 18. A compression spring 25 is employed to spring load the small piston with respect to the larger piston against the pressure within control chamber 17. Compression springs 23 and 25 bear at their upper ends against washer-like abutment members 31 and 32. The abutment member 31 is threadedly secured within housing 20 and may be axially adjusted to select the desired compression for spring 23 while member 32 is threadedly affixed on shank 24 and may be adjusted to select the desired compression for spring 25.

If the pressure in control chamber 17 falls below a predetermined value, the force against the top of the smaller piston 19 becomes insufficient to counter the upward force supplied by spring 25 and the smaller piston moves upward. It will be noted that the smaller piston 19 is permitted to move upwardly independent of the movement of the larger piston 18.

Upward movement of the small piston 19 will result in closure of main valve 10. When the small piston 19 is in its full downward position as shown in FIG. 1, the lower end of piston 19 which functions as a valve portion closes an orifice 36 in the upper end of a movable valve stem indicated generally at 38. A compression spring 40 biases the valve stem 38 upward against small piston 19 and towards engagement with valve seat 42. In the position shown in FIG. 1, the small piston 19 holds the stem 38 down to provide a passage between a frusto-conical surface 41 of stem 38 and the valve seat 42.

The vented, "three-way" pilot valve 12 controls the pressure in chamber 61 in main valve 10. With the small piston 19 in the position shown in FIG. 1, fluid flows upward through a central bore 51 through both valve plug 52 and main operating valve piston 54 and into a chamber 53 above piston 54. The pressure from flow line 50 is communicated from chamber 53 through a passage 55, through the opening between the valve stem 38 and the seat 42, into a pressure line 60. Pressure line 60 communicates with the lower chamber 61 in the main valve 10. Passages 55 and 60 define passage means for communicating the chamber 53 to the chamber 61.

As the small piston 19 moves upward in response to a decrease in control pressure below a predetermined low value, valve stem 38 moves upward closing the passage defined between the frusto-conical face 41 and valve seat 42. Further upward movement of the piston 19 opens the orifice 36 and allows pressure to be vented from the lower chamber 61, through the pressure line 60 and the passageway 65 within valve stem 38, through the orifice 36 and through the vent 67 to atmosphere. The venting of the lower chamber 61 allows the line pressure in upper chamber 53 to overcome the force of spring 62 and move the piston 54 and the valve plug 52 operatively connected thereto downward to seat plug 52 against the main valve seat 70 terminating flow through the flow line 50.

When the control pressure exceeds a predetermined high value, the high pressure piston 18 moves upwardly, compressing high pressure spring 23. Piston 18 engages with the shoulder 35 on the stem portion 24 of piston 19 and the small piston 19 is carried upwardly with the large piston. This results in bleeding of chamber 61 to the atmosphere and closure of the flow line 50 in the same manner as described above with respect to the control pressure falling below a predetermined low value. Thus, the shut-off valve is closed when the control pressure exceeds a predetermined high value.

After closure of the shut-off valve as a result of either "high" trip or "low" trip, the pilot mechanism and the main shut-off valve are automatically reset. In the event the control pressure is downstream pressure, a manual bypass valve may be needed to restore the downstream pressure to within the proper limits for automatically resetting the main shut-off valve.

FIGS. 2 and 3 show the inner details of a valve assembly embodying the invention. The same reference numerals are employed to designate like parts in FIGS. 1, 2 and 3. The main valve body 75 may be provided with threaded ports 77 and 78 which attach to the flow line being controlled. The main valve seat 70 comprises a tubular member threadably retained within the central portion of the main valve body 75. A tubular bonnet 80, mounted on the valve body 75, carries cylindrical housing 81. Lock nut 84 secures pilot body 86 to the housing 81. Shoulder plate or stop plate 21 rests against the upper surface of pilot body 86 and is retained in place by spring case 89, which is threadedly engaged with pilot body 86. The spring cap 90, which is threadably affixed to the spring case 89, completes the exterior housing for the overall valve assembly.

It is a feature of the present invention that the "high" and "low" tripping pressures may be adjusted separately. The adjustable "high" washer-like spring seat 31, so-called because it determines the upper threshold pressure required to actuate piston 54 to move valve 52, is threaded into the spring case 89. The adjustable "low" washer-like spring seat 32 is threadably mounted upon the upper end of small piston extension 91 and is retained in place by a lock nut 93. The high pressure spring 23 and the low pressure spring bear at their lower extremities against an annular seat 94 which abuts the shoulder plate 21. In a typical application, normal flow pressure in flow line 50 is on the order of 3200 p.s.i. Spring 23 is adjusted for a "high" trip of 4000 p.s.i. and spring 25 is adjusted for a "low" trip of 3000 p.s.i.

As best seen in the enlarged view of FIG. 3, vent passage 67 is formed in the pilot body 86 and is covered by a plate 97 which is held in place by suitable means such as screws 98 to prevent entry of foreign matter into the vent passage 67. The plate 97 also dissipates the force of the high pressure gas vented from vent passage 67 during operation. The control pressure is applied to the chamber 17 by way of a threaded port 16 and internal passage 16a as best seen in FIG. 3. A threaded plug 98a closes the pressure passage 60 through the pilot body 86 to the atmosphere.

The three-way pilot valve 38 is of the non-bleed type. If the valve were of the throttling type, high pressure gas discharging through the pilot valve would tend to freeze and the pilot valve would freeze up, causing the device to malfunction. In the present arrangement, surface 41 is engaged with seat 42 before the small piston 19 moves to permit bleeding or venting of gas through passage 67.

Further, the O-rings 101 and 103 cooperate with the three-way pilot valve so as to statically balance the valve. O-ring 101 balances the pressure across orifice 36 and O-ring 103 balances the pressure across the annular opening between surface 41 and seat 42. By virtue of this balancing of the pilot valve, it is possible to obtain a more accurate control of the "high" trip point and the "low" trip point, that is, the device will reliably function over a period of time to close the main shut-off in the event the control pressure exceeds a predetermined high value or falls below a predetermined low value.

As best seen in FIG. 3, O-ring seal means are provided about pistons 18 and 19 and between the exterior of shank 24 and the interior of piston 18 to close off chamber 17. Thus in use, no control pressure supplied through pressure inlet 16 is vented from the valve assembly.

The pressure in chamber 17 normally urges the pistons 18 and 19 in opposite directions. The pistons are sized and cooperate with one another and with the pilot valve 12 to produce an automatic shut-off valve assembly of improved sensitivity and accuracy.

There has been provided by the present invention an improved automatic shut-off valve assembly that will close a flow line in the event pressure rises above or falls below predetermined high or predetermined low values. The invention incorporates a three-way pilot valve that cooperates with a high-low actuator means to provide for a controlled bleed of fluid to permit actuation of the actuator piston and closure of the main valve in the event control pressure falls below a predetermined low value or rises above a predetermined high value. A continuous bleed through the three-way pilot valve is undesirable as it is wasteful of fluid from the system to be controlled. Further, the possibility of "freeze up" as occurs when using continuous throttling-type bleed arrangements is minimized by use of the present control bleed arrangement.

Separate means are provided in the improved valve assembly of this invention independently adjusting the high pressure spring and low pressure spring to permit independent setting of the upper and lower limits of the control range.

It will be apparent to those skilled in the art that the main shut-off valve 10, the three-way pilot valve means 12 and the actuator mechanism 14 may be housed in a common casing or separate casings may be used for each subassembly. Further, if desired, the three-way pilot valve means and the actuator mechanism may be enclosed in a common housing.

While we have described and illustrated a preferred embodiment of our invention, it will be understood that our invention is not limited thereto since it may be otherwise embodied within the scope of the following claims.

What is claimed is.

1. A pressure responsive shut-off valve assembly including a shut-off valve adapted to stop fluid flow in a flow line in the event a control pressure exceeds or falls below predetermined values, said valve assembly comprising a housing means, a first bore defined in said housing means, a second, larger bore within said housing means axially aligned with said first bore, a small piston disposed for sliding motion in said first bore, a large piston disposed for sliding motion in said second bore, a control chamber being defined at the intersection of said bores, means for supplying a control pressure to the said control chamber tending to force said pistons apart, means for biasing said large piston in opposition to the force exerted against said large piston by said control pressure, means for biasing said small piston with respect to said large piston against said control pressure, means coupling said pistons for carrying said small piston in a first axial direction whenever said large piston moves in said first axial direction while permitting said small piston to move in said first axial direction independently of said large piston, and three-way pilot valve means responsive to the movement of said small piston for opening and closing said shut-off valve.

2. A pressure responsive shut-off valve assembly as in claim 1 including a main piston for operating said shut-off valve, said piston defining a first chamber and a second chamber in said housing means, means for applying pressure upstream of said shut-off valve assembly to said first chamber, said three-way pilot valve means being operable to vent the second chamber to permit closing of the shut-off valve.

3. A pressure responsive shut-off valve assembly as in claim 2 wherein spring means are provided for biasing the shut-off valve toward open position, whereby when the control pressure exceeds a predetermined high value or falls below a predetermined low value, the small piston will move in said first axial direction to permit movement of the three-way pilot valve to vent said second chamber and enable the pressure acting against the main piston in the first chamber to overcome the force of the spring means biasing the shut-off valve open, and thereby close the shut-off valve.

4. A pressure responsive shut-off valve assembly as in claim 3 wherein the means for applying upstream pressure to said first chamber comprises a bore in the stem of the shut-off valve.

5. A pressure responsive shut-off valve assembly as in claim 1 wherein separate means are provided for independently adjusting the biasing force of the large piston biasing means and the small piston biasing means so as to separately adjust the predetermined high and low operating valves of the shut-off valve assembly.

6. A pressure responsive shut-off valve assembly as in claim 5 wherein the biasing means for the large piston and the small piston each comprise coil springs, the coil springs abutting relatively fixed supports at one end and being separately supported at the other end by first and second abutment means that are separately adjustable to provide for independent adjustment of the coil spring.

7. A pressure responsive shut-off valve assembly as in claim 6 wherein the large piston is annular and has an opening therethrough and the small piston includes an elongated stem portion that extends through the opening in the large piston, said coil springs being concentric with respect to one another about the elongated stem, said first abutment means comprising an annular washer-like member threadedly secured within the housing means and adapted to operatively abut one coil spring and said second abutment means comprising an annular washer-like member threadedly secured to said elongated stem and adapted to operatively abut the other coil spring.

8. A pressure responsive shut-off valve assembly as in claim 1 wherein sealing means are provided for sealing the control chamber and control pressure is not vented.

9. A pressure responsive shut-off valve assembly as in claim 1 wherein the control pressure supply means is communicated with the flow line downstream of the shut-off valve assembly for supplying downstream pressure to the control chamber.

10. A pressure responsive shut-off valve assembly as in claim 2 wherein passage means are provided for communicating the first chamber with the second chamber, said passage means being adapted to be connected to a vent passage, said three-way pilot valve means being movable to selectively communicate said passage means to said vent passage to control the venting of pressure from said second chamber.

11. A pressure responsive shut-off valve assembly as in claim 10 wherein a valve seat is defined in said passage means, and said three-way pilot valve means comprises an elongated stem having a seating surface for engaging said valve seat to close said passage means, spring means for biasing said seating surface toward said valve seat and orifice means in said stem, said orifice means being adapted to be closed by said small piston, whereby when said small piston moves in said first axial direction, said stem moves to close the passage means and the orifice means is opened to vent the second chamber, thereby permitting closure of the shut-off valve.

References Cited
UNITED STATES PATENTS 2,619,109 11/1952 Garrett et al. _____ 251—28
3,043,331 7/1962 Peters _____ 137—458

A. ROSENTHAL, *Primary Examiner.*